H. C. CASHON.
HAY PRESSER.
APPLICATION FILED DEC. 28, 1911.
1,029,422.
Patented June 11, 1912.
5 SHEETS—SHEET 3.
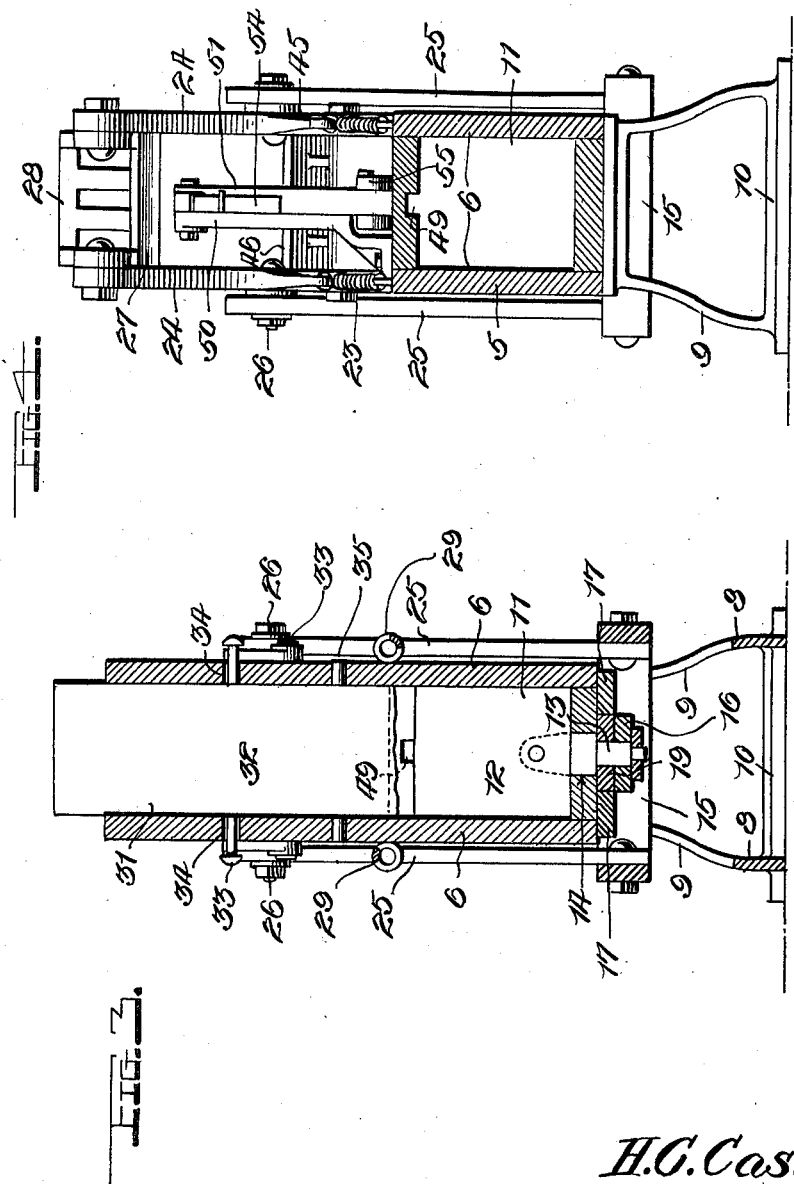
Witnesses
Chas. L. Grieshaver.
G. B. Norton.
Inventor
H.C. Cashon.
By Watson E. Coleman
Attorney

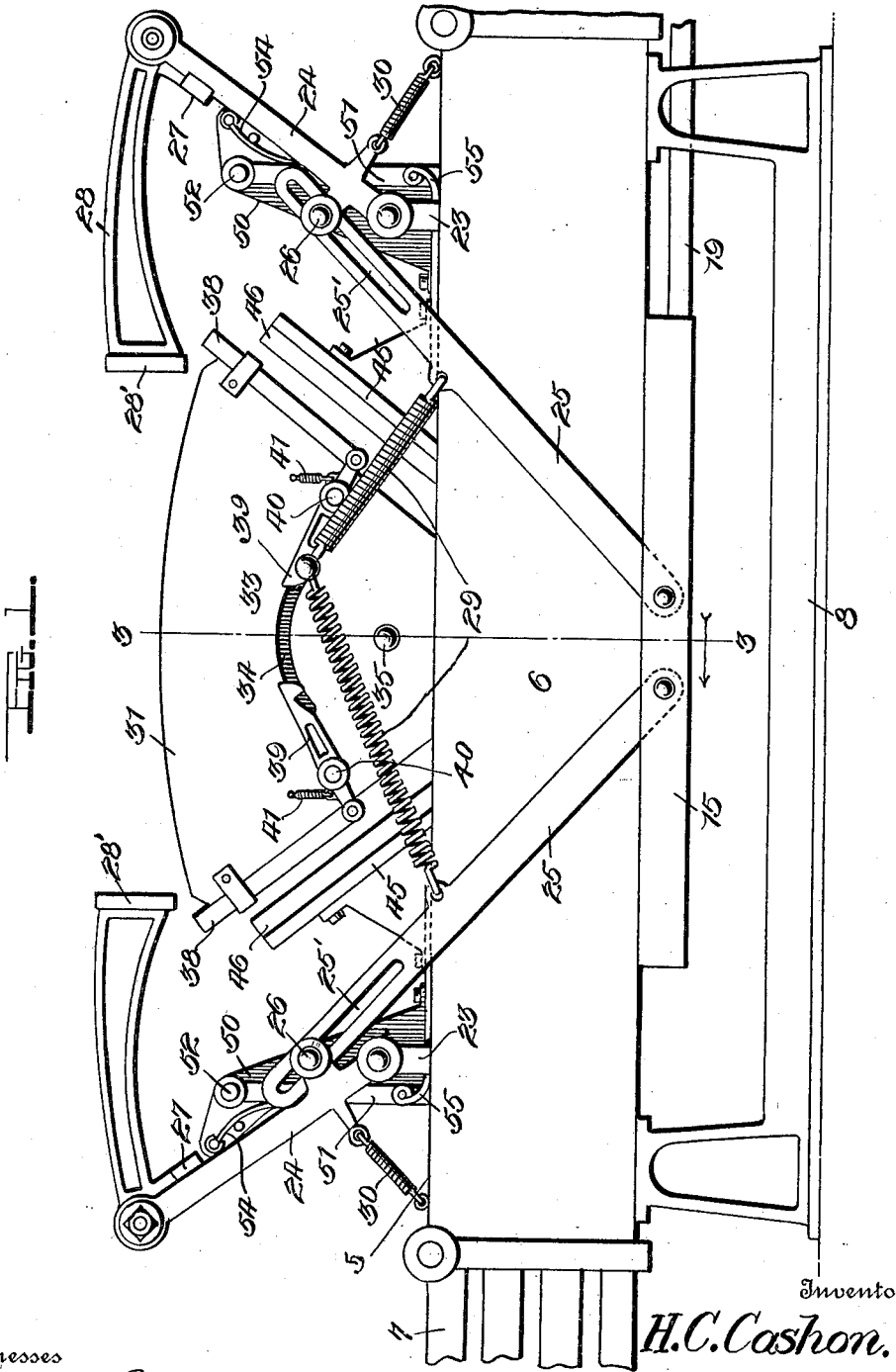

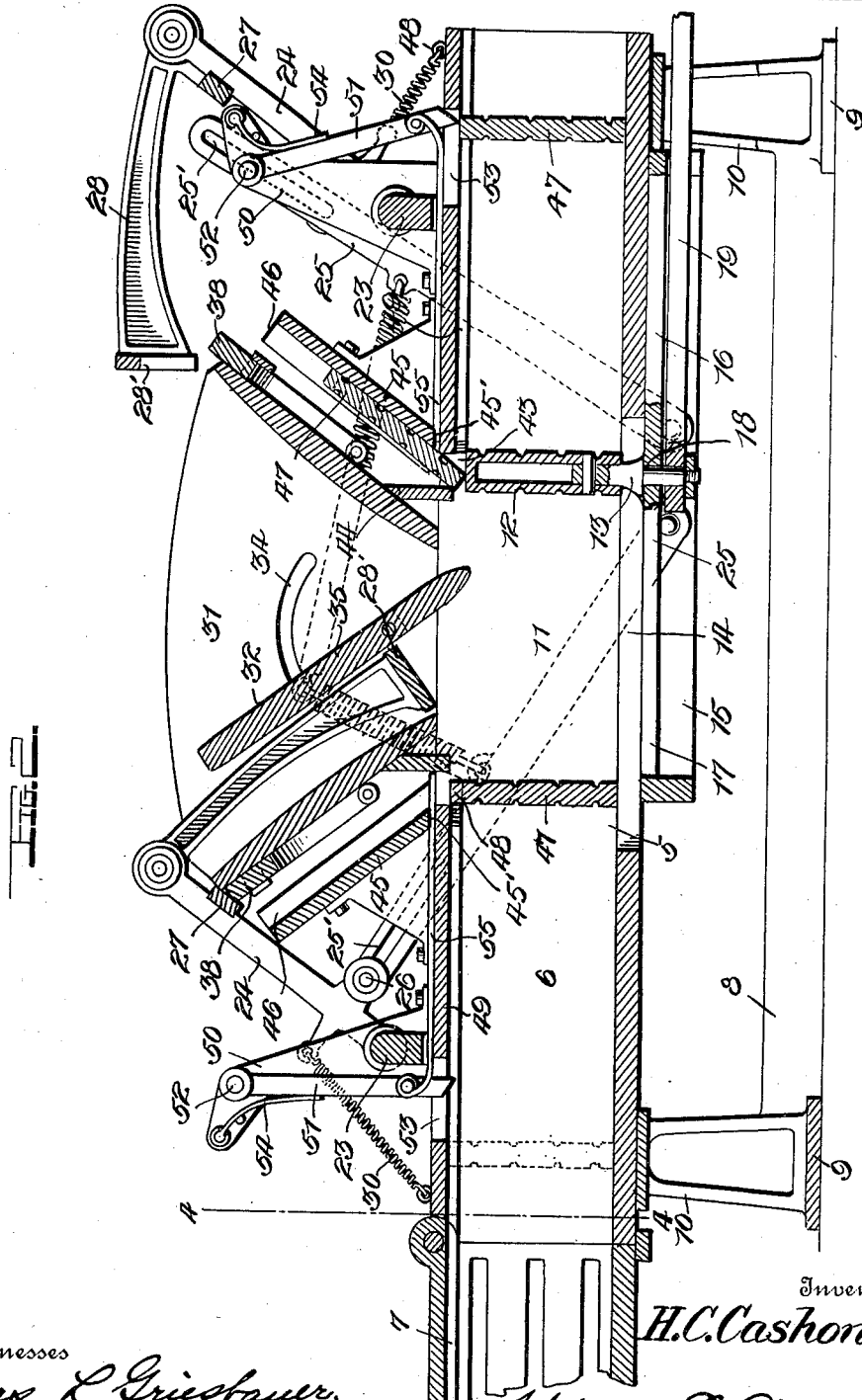

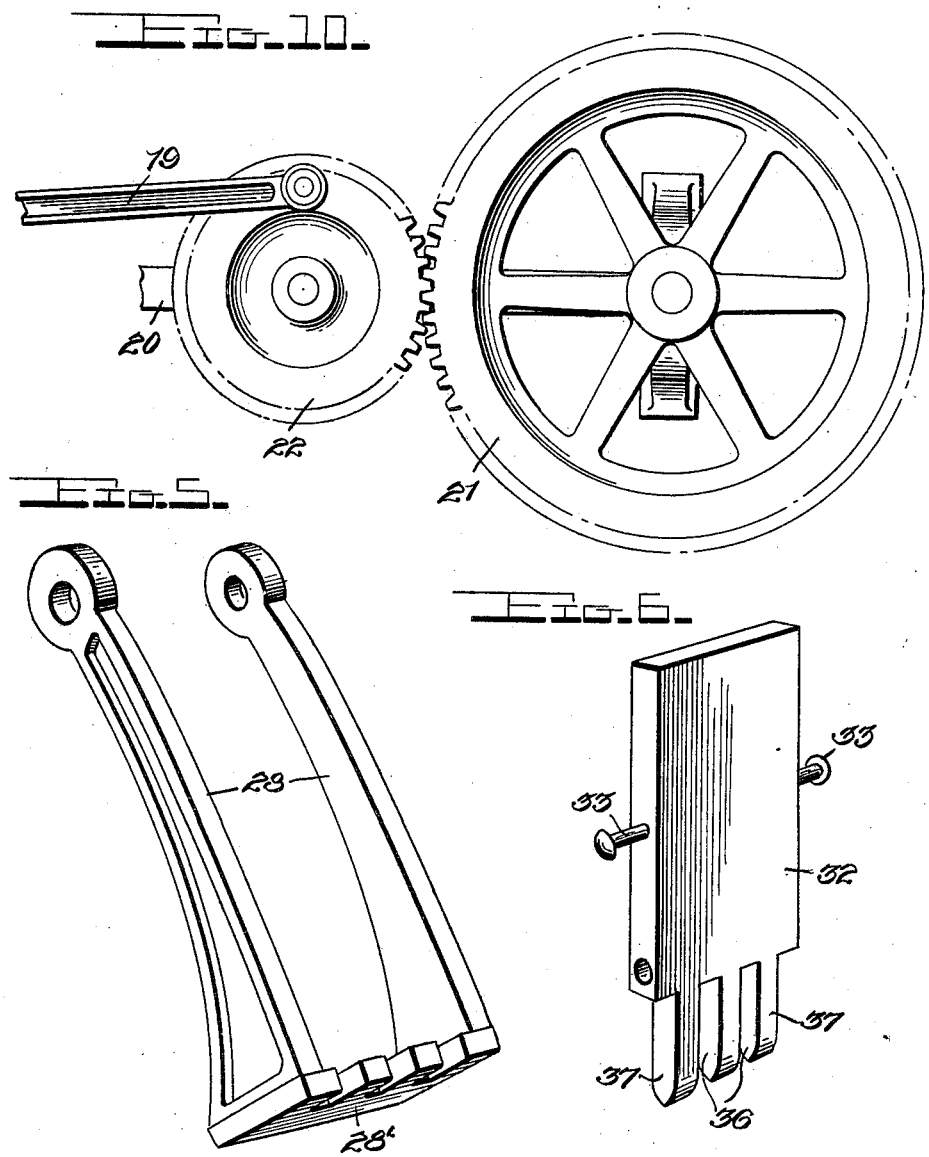

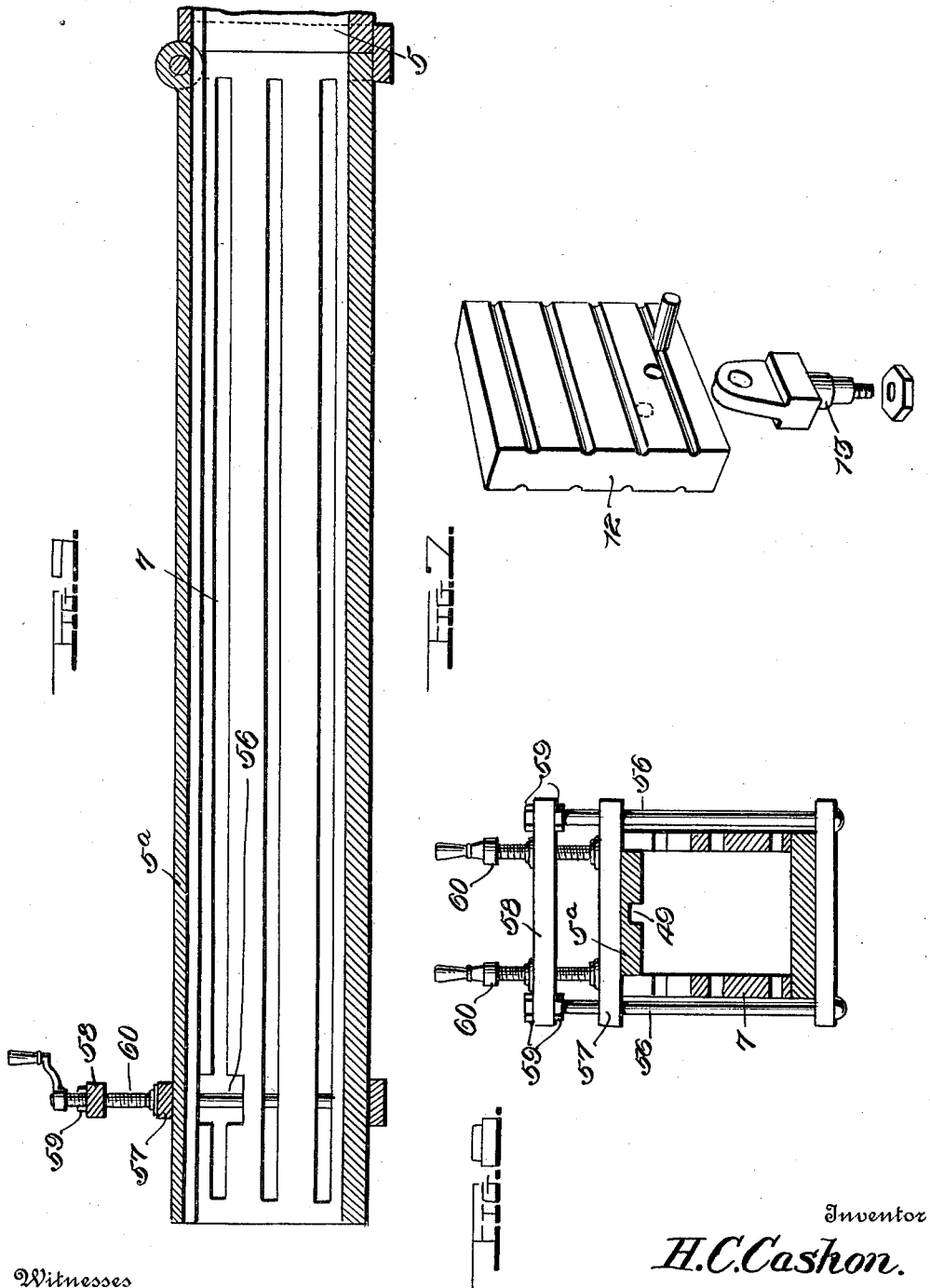

UNITED STATES PATENT OFFICE.

HENRY CLARENCE CASHON, OF OKTAHA, OKLAHOMA.

HAY-PRESSER.

1,029,422.

Specification of Letters Patent.

Patented June 11, 1912.

Application filed December 28, 1911. Serial No. 668,269.

*To all whom it may concern:*

Be it known that I, HENRY CLARENCE CASHON, a citizen of the United States, residing at Oktaha, in the county of Muskogee and State of Oklahoma, have invented certain new and useful Improvements in Hay-Pressers, of which the following is a specification, reference being had to the accompanying drawings.

This invention relates to improvements in hay pressers of that type wherein a reciprocating plunger operates in the baling chamber, and the invention has for its primary object the provision of simple and efficient means for automatically feeding the material to the baling chamber, such material to be compressed into bales of uniform size in the movement of the plunger in both directions.

Another and more specific object of the invention is to provide means automatically actuated to feed hay or other material to the baling chamber synchronously with the movement of the plunger in the rear thereof whereby lost motion in the reciprocatory movement of the plunger is eliminated and the capacity of the machine materially increased.

A further object of the invention is to provide novel means for positioning a division board or head between the several bales contained in the machine, said means being automatically actuated by one of the bales in its movement.

Still another object of the invention is to provide means arranged in the feed hopper of the machine to divide the same and prevent the feed of material into that portion of the baling chamber in which the material is being compressed, said means being automatically moved to its operative position by the feeding members, and means for retaining the guard means in such operative position.

With the above and other objects in view, the invention consists of the novel features of construction, combination and arrangement of parts hereinafter fully described and claimed, and illustrated in the accompanying drawings, in which—

Figure 1 is a side elevation of a hay press embodying my improvements; Fig. 2 is a longitudinal section thereof; Fig. 3 is a section taken on the line 3—3 of Fig. 1; Fig. 4 is a section taken on the line 4—4 of Fig. 2; Fig. 5 is a perspective view of one of the force feed members; Fig. 6 is a similar view of the movable guard member which is arranged in the hopper; Fig. 7 is a perspective view of the plunger or presser head; Fig. 8 is a transverse section through the end of one of the bale receiving chambers; Fig. 9 is a longitudinal section of said chamber; and Fig. 10 is a detail plan view of the operating gearing.

5 designates a body which is constructed in the usual manner and consists of the solid side walls 6 which form the sides of the baling chamber and the open end portions 7 into which the compressed bales are moved in the reciprocation of the plunger. This body is mounted upon a frame consisting of the longitudinal side bars 8 and the transverse connecting bars 9 to the opposite ends of which are rigidly fixed the vertical supporting legs or standards 10. The baling chamber is rigidly mounted upon the upper ends of these standards.

Within the baling chamber 11 the longitudinally movable reciprocating plunger 12 is arranged, and this plunger is provided upon its lower end with the depending stud 13 which is movable in a longitudinal slot 14 provided in the bottom of the baling chamber. A rectangular frame 15 is longitudinally movable between the bottom of the baling chamber and the supporting base frame thereof and includes a central longitudinal bar 16 which is disposed between the guide cleats 17 secured to the bottom of the baling chamber. This bar is provided with a central opening 18 to receive the lower end of the stud 13 on the plunger 12. An operating pitman 19 is loosely connected at one of its ends to this stud 13 and extends beyond one end of the baling chamber. A longitudinal base bar 20 is fixed to the supporting frame and has mounted thereon the power gear 21 and the transmission gear 22 which meshes therewith and to which the forward end of the pitman 19 is eccentrically connected. The gear 21 may be driven from any suitable source of power and in any desired manner.

Upon the top of the body 5 and at opposite ends thereof suitable transverse supports 23 are mounted and upon the ends of these supports the lower ends of the arms 24 are pivoted. A pair of bars 25 are arranged upon opposite sides of the body of the machine and are pivoted at their lower ends to the side bars of the longitudinally movable frame 16. These bars extend in divergent relation and are provided in their other ends with the longitudinal slots 25' which are movable upon the bolts 26 fixed in the arms 25 adjacent to their pivoted lower ends. These arms 24 at each end of the machine are connected by the transverse bars 27 and have fixed to their upper ends the inwardly extending presser members 28, said members consisting of parallel bars fixed at one of their ends to the arms 24 and connected at their other ends by the transverse bars 28'. Coiled springs 29 connect the diverging bars 25 on each side of the machine to the studs 33 of a movable guard member arranged in the hopper which will be later described. Springs 30 are also connected to the pivoted arms 24 and to the ends of the body 5 and yieldingly hold the feeding members in their raised or ineffective positions against the action of the movable bars 25, as will be more fully understood from the following description.

The feed hopper 31 is mounted upon the body 5 and centrally above the baling chamber. In this hopper a movable guard member 32 is arranged, said member extending the entire width of the hopper and being provided in its opposite edges with the studs 33 which are movable in the arcuate slots 34 in the side walls of the hopper. This guard member adjacent to its lower end is provided with trunnions 35 which are journaled in the side walls of the hopper. The lower end of said member is also provided with a plurality of longitudinally extending grooves or bifurcations 36 whereby the spaced tongues 37 are formed. The cross bars 28' of the feeders are provided in one of their edges with grooves for the reception of these tongues so that the guard member does not in any way interfere with the proper operation of said feeders. At the same time, by providing the projecting lower end portion of said member the material which is being acted upon by the feeders is prevented from being forced into the chamber which has been previously supplied and in which the material is being compressed by the plunger. I also provide means for automatically locking said guard member in position while the material is being forcibly fed into one end of the baling chamber, said member being engaged and released by the feeder when the chamber has been supplied. This mechanism is substantially as follows. A transversely disposed bar 38 is arranged upon the outer face of each of the inclined end walls of the hopper 31 and to the ends of said bars adjacent their lower edges the latch fingers 39 are secured, said fingers projecting inwardly upon the side walls of the hopper. These fingers are pivoted to the hopper walls adjacent to the bars 38 as indicated at 40 and coil springs 41 are secured at one of their ends to the hopper and at their other ends to the fingers 39, thereby normally forcing the inner ends of the latch members down. From reference to Fig. 1, the operation of this portion of the machine will be readily understood. Assuming that the guard member 32 is in the inclined position shown in Fig. 2, wherein one of the springs 29 on each side of the hopper is under tension, and the material is being fed into the left hand portion of the baling chamber, when the feeding member has descended and forced the material into the plunger chamber, the arms 24 engage the upper end of the bar 38 and force the same downwardly against the tension of the spring 41. This downward movement of the bar 38 lifts the inner ends of the latch fingers 39 which are connected to said bars and disengages the same from the studs 33 carried by the guard member. Simultaneously with this release of the guard member, the movement of the plunger is reversed and the expanded springs 29 contact and swing the guard member upon its pivot to the reverse inclined position from that shown in Fig. 2. The other of the feeder members now acts upon the material in the left hand side of the hopper and forces the material into the baling chamber behind the plunger as it moves longitudinally in said chamber to compress the material which was previously fed thereto. By providing the guard member it will be readily seen that the material may be fed into one end of the hopper at the same time that the presser descends through the opposite end thereof.

At the lower end of the feed hopper and upon each side thereof the top of the baling chamber is provided with a transverse opening 43 and a vertical wall 44 is arranged at one edge of this opening and is secured at its upper end to the end wall of the hopper. A block support and directing plate 45 is arranged at the opposite edge of said opening and extends upwardly and laterally therefrom. This plate is provided upon its longitudinal edges with the side flanges 46 between which the division heads or blocks 47 are adapted to be arranged. Upon one end of these blocks the reduced extensions 48 are formed and are adapted to be received in the longitudinal grooves or guideways 49 formed in the under side of the top wall of the bale receiving chambers. Upon the transverse supports 23 the vertical standards 50 are arranged, and an arm 51 is pivoted at its upper end as at 52 upon one face of said standard. The lower end of this arm extends through a longitudinal slot 53 in the top wall of the body 5 and is yieldingly held against movement therein by means of a leaf spring 54 one end of which is secured to the standard 50. To the arm 51 adjacent its lower end one end of a longitudinally disposed slidable plate 55 is loosely connected, said plate being movable beneath the support 23 and through a recess 45' provided in the lower end of the block supporting plate 45. The blocks 47 are preferably provided in their opposite faces with transverse wire receiving grooves for the accommodation of the usual binding wire which is adapted to be passed around the bales. In the reciprocation of the plunger 12 to compress the material, the head or division block 47 which is disposed at one end of the bale is moved in advance thereof, the projection 48 extending into the guide groove 49 as previously explained. One of the division heads is placed upon the end of the sliding plate 55 which projects beneath the lower end of the guide plate 45 and when the projection 48 of block 47 strikes the lower end of the pivoted arm 51, said arm is moved in the slot 53 to withdraw the end of the plate 55 from beneath said block whereupon the same moves through the opening 43 in the top of the baling chamber. Simultaneously with this movement of the block, the plunger starts upon its return stroke and the block 47 falls between the side walls of the chamber and is supported in such position by the material which is immediately fed into the chamber. By providing this automatic means for arranging the division heads in the baling chamber the uniform size of the bale is assured.

From the foregoing it will be seen that when the frame 15 is reciprocated, the feeding members are alternately moved into the hopper to force the material therein downwardly into the baling chamber, such material occupying the space vacated by the plunger in its longitudinal movement. When the plunger reaches the end of its stroke in one direction, the baling chamber is filled and the material therein is compressed upon the return stroke of the plunger, the material being simultaneously fed into the chamber by the other of the feeder members behind the plunger during its movement. It will thus be seen that there is no lost motion whatever of the plunger and compression takes place upon each stroke thereof. By also providing my improved means for positioning the division blocks between the ends of adjacent bales, the machine is entirely automatic in its action so that a large quantity of hay or other material may be baled in a minimum length of time.

Adjacent to the discharge end of each of the bale receiving chambers and upon each side thereof the vertical guide members 56 are secured, said guide members projecting above the top of the bale chamber. The top 5ª of each of the bale receiving chambers is pivotally connected at its inner end to one end of the plunger chamber and upon the guide rods 56 a movable transverse presser bar 57 is arranged. Upon the upper ends of these guide rods a transverse bar 58 is rigidly secured by means of the nuts 59 which are threaded upon the ends of said rods. Adjusting screws 60 are threaded in the transverse bar 58 and bear at their lower ends upon the movable bar 57 which in turn bears upon the end of the movable top 5ª of the bale chamber. It will thus be seen that by adjusting the screws 60 any desired amount of pressure on the ends of the pivoted tops 5ª and upon the bales may be secured. In this manner the cross sectional area of the bale receiving chambers at their discharge ends may be varied as desired and the requisite pressure upon the hay can be obtained.

The machine is comparatively simple in construction and owing to the substantial form of the various elements employed therein, the durability of hay presses of this character is materially increased so that the expense of repair will be trivial.

While I have shown and described the preferred construction and arrangement of the various parts, it will be understood that the device is susceptible of a great many minor modifications without departing from the essential feature or sacrificing any of the advantages thereof.

Having thus described the invention what is claimed is:—

1. In a hay press, the combination of a body provided with a baling chamber and a hopper in communication therewith, a plunger to reciprocate in said hopper and means for actuating the same, feeding means movable into the hopper, a movable guard member mounted in the hopper, latch devices to hold said guard member against movement automatically actuated to release said member at the end of the reciprocatory movement of the plunger in each direction, and additional means to move said guard member when the same is released and position the same relative to the feeding members.

2. In a hay press, the combination of a body provided with a baling chamber and a hopper in communication therewith, a plunger to reciprocate in said hopper and means for actuating the same, a vertically disposed guard member movably mounted in the hopper, feeding members movable into the hopper on opposite sides of the guard member, means to alternately move said feeding members into the hopper in the actuation of the plunger, latch devices to hold the guard member against movement automatically actuated to release said member when the feed members are moved to their full extent into the hopper, and means for moving said guard member when the same is released to position the same relative to the respective feed members.

3. In a hay press, the combination of a body provided with a baling chamber, a hopper, a plunger to reciprocate in said chamber and means for actuating the same, means for forcibly feeding the material to said chamber behind the plunger during its movement in each direction, and means arranged within the hopper with which said feeding means co-acts to insure the uniform feed of material to the baling chamber in the movement of the plunger in opposite directions.

4. In a hay press, the combination of a body having a baling chamber and a hopper in communication therewith, a plunger to reciprocate in the chamber and means for actuating the same, a vertically disposed guard member pivotally mounted at its lower end in said hopper, feeding members movable into the hopper upon opposite sides of the guard member, means for alternately moving said members into the hopper in the reciprocation of the plunger, spring controlled latch devices to hold said guard member against pivotal movement, means connected to said latch devices and actuated by the feeding members to release the guard member at the end of the movement of the plunger in each direction, and means to move said guard member upon its release and dispose the same with relation to the feeding members during their movement into the hopper.

5. In a hay press, the combination of a body having a central baling chamber, a hopper arranged above said chamber, a plunger to reciprocate in the baling chamber and means for actuating the same, a pair of feeding members alternately movable into the hopper in the movement of the plunger in opposite directions, a guard member pivotally mounted in the hopper and disposed at an inclination therein when the material is being fed to the baling chamber, latch devices to secure said member in its inclined position, said feed members co-acting with the latch devices to release the guard member, and means to dispose the same at an opposite inclination in the hopper, substantially as and for the purpose specified.

6. In a hay press, the combination of a body having a central baling chamber, a hopper arranged above said chamber, a plunger to reciprocate in the chamber and means for actuating the same, feed members pivotally mounted upon the body at each end of the hopper, means for operating said members synchronously with the movement of the plunger to forcibly feed the material to the baling chamber as the plunger progresses in its reciprocatory movement, a guard member pivotally mounted in the hopper adjacent to its lower end and extending into the same, means for limiting the pivotal movement of said member whereby the same is disposed in an inclined position upon opposite sides of the center of the hopper, latch devices for holding said member in its inclined position, said feed members actuating said latch devices upon the completion of the feeding operation to release said member, and means for reversing the inclination of the guard member in said hopper.

7. In a hay press, the combination of a body having a baling chamber and a hopper in communication therewith, a guard member pivotally mounted in the hopper, feeding members alternately movable into the hopper upon opposite sides of said guard member in the reciprocatory movement of the plunger, means normally holding said guard member against movement automatically actuated upon the completion of each feeding of the material to the baling chamber, actuating means for said feeding members, and springs connected to said actuating means and to the guard member to move said member upon its release and position the same in the hopper with relation to said feeding members.

8. In a hay press, the combination of a body having a baling chamber and a feed hopper in communication therewith, a plunger to reciprocate in said chamber and actuating means therefor, a guard member vertically disposed in said hopper and pivotally mounted for movement therein to inclined positions upon opposite sides of the center of the hopper, holding devices to hold the guard member in such inclined positions, feeding members alternately movable into the hopper upon opposite sides of said guard member, means automatically actuated at the end of the movement of each of the feeding members into the hopper to operate the holding devices and release the guard member, and springs connected to said guard member alternately acting to reverse the inclined position of the guard member in the hopper upon its release to position the same with relation to the respective feeding members.

9. In a hay press, the combination with a body having a baling chamber and a plunger to reciprocate therein, said body having an opening in its top at one end of the baling chamber, of a longitudinally movable block support disposed over said opening, and means to be engaged by a block arranged in advance of the bale and moved thereby whereby the block supporting means is moved to deposit the block supported thereby in the baling chamber.

10. In a hay press, the combination with a body having a baling chamber and a plunger to reciprocate therein, said body having an opening in its top at one end of the baling chamber, of a division block provided with an extension on one end, a guide for said block arranged above the opening, a pivoted arm, a supporting plate pivoted to said arm and extending over said opening to support the block, the extension on said block engaging said arm in the longitudinal movement of the bale whereby said supporting plate is withdrawn and the block supported thereby deposited in the baling chamber.

11. In a hay press, the combination with a body having a baling chamber and a plunger to reciprocate therein, said body being provided with an opening at one end of the baling chamber, of an inclined guide plate extending above said opening, a division block to be arranged upon said plate and provided with an extension at one end, and a longitudinally movable yieldingly held supporting plate for the block extending over said opening, the extension on the block automatically moving the plate in the movement of the bale whereby the block supported by said plate is deposited in the baling chamber.

12. In a hay press, the combination with a body having a baling chamber and a plunger to reciprocate therein, said body being also provided with a transverse opening and a longitudinal slot in its top wall, of a division block to be disposed between the ends of adjacent bales having an extension formed upon its end, the top wall of said body having a longitudinal groove to receive said extension, a guide plate extending above said opening upon which the block is adapted to be arranged, a pivotally mounted spring pressed arm having its free end disposed through the longitudinal slot in said body, and a supporting plate for the block loosely connected at one end to said arm and extending at its other end above the opening, said arm being automatically actuated by the engagement of the extension of said block with the lower end thereof to move the supporting plate and deposit a block in the baling chamber.

13. In a hay press, the combination of a body provided with a baling chamber, a plunger to reciprocate in said chamber and means for actuating the same, a hopper arranged above said chamber, a pair of feeding members alternately movable into opposite ends of the hopper in the reciprocatory movement of the plunger, and a guard member movably mounted in the hopper and means to move said guard member when the feeding members reach the limit of their movement into the hopper whereby a uniform quantity of material is fed to the baling chambers in the movement of the plunger in each direction.

14. In a hay press, the combination with a body having a baling chamber and a plunger to reciprocate therein, a movable block support mounted upon the top of the body to support a block above one end of the baling chamber, and means connected to said support and actuated by a block arranged in advance of the bale as the bale is moved in the reciprocation of the plunger to move said support from beneath the block arranged thereon and deposit the block in the baling chamber.

15. In a hay press, the combination with a body having a baling chamber and a plunger to reciprocate therein, said body being provided with a longitudinal slot in its top wall, of a movable block support mounted upon the top of the body to support a block above one end of the baling chamber, and a pivoted member connected to said support and extending through the slot of the body wall to be engaged by a block in advance of the bale which is moved in the reciprocation of the plunger whereby said block support is moved to release the block arranged thereon and deposit the same in the baling chamber.

In testimony whereof I hereunto affix my signature in the presence of two witnesses.

HENRY CLARENCE CASHON.

Witnesses:
    FLOYD HUNES,
    C. M. MULLEN.

---

Copies of this patent may be obtained for five cents each, by addressing the "Commissioner of Patents, Washington, D. C."